(12) United States Patent
Mittal et al.

(10) Patent No.: US 12,335,007 B2
(45) Date of Patent: Jun. 17, 2025

(54) CHANNEL STATE INFORMATION REPORT COEFFICIENTS

(71) Applicant: Lenovo (Singapore) PTE. LTD., New Tech Park (SG)

(72) Inventors: Udar Mittal, Rolling Meadows, IL (US); Ahmed Monier Ibrahim Saleh Hindy, Aurora, IL (US); Tyler Brown, Lake Zurich, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 303 days.

(21) Appl. No.: 17/905,739

(22) PCT Filed: Mar. 1, 2021

(86) PCT No.: PCT/IB2021/051700
§ 371 (c)(1),
(2) Date: Sep. 6, 2022

(87) PCT Pub. No.: WO2021/176334
PCT Pub. Date: Sep. 10, 2021

(65) Prior Publication Data
US 2023/0109788 A1   Apr. 13, 2023

Related U.S. Application Data

(60) Provisional application No. 62/986,587, filed on Mar. 6, 2020.

(51) Int. Cl.
*H04B 7/06* (2006.01)
*H04L 5/00* (2006.01)

(52) U.S. Cl.
CPC ......... *H04B 7/0626* (2013.01); *H04B 7/0617* (2013.01); *H04B 7/0634* (2013.01); *H04L 5/0051* (2013.01)

(58) Field of Classification Search
CPC ... H04B 7/0626; H04B 7/0617; H04B 7/0634
See application file for complete search history.

(56) References Cited

U.S. PATENT DOCUMENTS 10,547,362 B2 * 1/2020 Varatharaajan ...... H04B 7/0482
2005/0243944 A1 * 11/2005 Suehiro ................ H04J 13/105
375/295

(Continued)

FOREIGN PATENT DOCUMENTS

WO   2019029675 A1   2/2019

OTHER PUBLICATIONS

PCT/IB2021/051700, "Notification of Transmittal of the International Search Report and the Written Opinion of the International Searching Authority, or the Declaration", International Searching Authority, Jul. 21, 2021, pp. 1-17.

(Continued)

*Primary Examiner* — Won Tae C Kim
(74) *Attorney, Agent, or Firm* — Kunzler Bean & Adamson

(57) ABSTRACT

Apparatuses, methods, and systems are disclosed for channel state information report coefficients. One method (700) includes receiving (702), at a user equipment, a set of reference signals. The method (700) includes identifying (704) a set of ports based on the set of reference signals. The method (700) includes selecting (706) a subset of ports from the set of ports. The method (700) includes computing (708) a subset of coefficients corresponding to a set of indices for each reference signal in the set of reference signals. The method (700) includes generating (710) a channel state information report comprising the subset of coefficients corresponding to the set of indices for each port in the subset of ports.

20 Claims, 8 Drawing Sheets

(56) References Cited

U.S. PATENT DOCUMENTS

| | | |
|---|---|---|
| 2016/0157218 A1 | 6/2016 | Nam et al. |
| 2019/0037426 A1 | 1/2019 | Yu et al. |
| 2023/0163911 A1* | 5/2023 | Hao ....................... H04B 7/063 370/329 |

OTHER PUBLICATIONS

3GPP, 3rd Generation Partnership Project; Technical Specification Group Radio Access Network; NR; Physical layer procedures for data (Release 16), 3GPP TS 38.214 V16.0.0, Dec. 2019, p. 1-147.
Vivo, Evaluation on CSI omission scheme, 3GPP TSG RAN WG1 Meeting #97 R1-1906164, May 13-17, 2019, p. 1-4.
Samsung, on UCI design and omission for DFT-based compensation, 3GPP TSG RAN WG1 Meeting #97 R1-1906975, May 13-17, 2019, p. 1-4.
Ericsson, On CSI omission procedure, 3GPP TSG RAN WG1 Meeting RAN1#97 R1-1907076, May 13-17, 2019, p. 1-6.
Qualcomm Incorporated, CSI Enhancement for MU-MIMO Support, 3GPP TSG RAN WG1 Meeting #97 R1-1907288, May 13-17, 2019, p. 1-15.
Samsung, "New WID: Further enhancements on MIMO for NR" 3GPP TSG RAN Meeting #86 RP-193133, Dec. 9-12, 2019, pp. 1-5.
Y. Han et al., "Efficient Downlink Channel Reconstruction for FDD Multi-Antenna Systems," IEEE Transactions on Wireless Communications, pp. 3161-3176, 2019.
H. Yin et al., "Addressing the curse of mobility in massive MIMO with Prony-based angular-delay domain channel predictions," Dec. 2019. [Online]. Available: http://arxiv.org/abs/1912.11330.

* cited by examiner

500

| $(W(1),f_1\omega_1)$ | $(W(2),f_1\omega_1)$ | $(W(3),f_1\omega_1)$ | $(W(1),f_1\omega_2)$ | $(W(1),f_1\omega_3)$ | | | |
|---|---|---|---|---|---|---|---|
| $(W(1),f_2\omega_1)$ | $(W(2),f_2\omega_1)$ | $(W(3),f_2\omega_1)$ | $(W(2),f_1\omega_2)$ | $(W(2),f_1\omega_3)$ | | | |
| $(W(1),f_3\omega_1)$ | $(W(2),f_3\omega_1)$ | $(W(3),f_3\omega_1)$ | $(W(3),f_1\omega_2)$ | $(W(3),f_1\omega_3)$ | | | |
| $(W(1),f_4\omega_1)$ | $(W(2),f_4\omega_1)$ | $(W(3),f_4\omega_1)$ | | | | | |

| (W(1),f₁τ₁₁) | (W(2),f₁τ₂₁) | (W(3),f₁τ₃₁) | (W(1),f₁τ₁₂) | | | | |
| (W(1),f₂τ₁₁) | (W(2),f₂τ₂₁) | (W(3),f₂τ₃₁) | (W(1),f₂τ₁₂) | | | | |
| (W(1),f₃τ₁₁) | (W(2),f₃τ₂₁) | (W(3),f₃τ₃₁) | (W(1),f₃τ₁₂) | | | | |
| (W(1),f₄τ₁₁) | (W(2),f₄τ₂₁) | (W(3),f₄τ₃₁) | | | | | |

FIG. 6

CHANNEL STATE INFORMATION REPORT COEFFICIENTS

CROSS-REFERENCE TO RELATED APPLICATIONS

This application claims priority to U.S. Patent Application Ser. No. 62/986,587 entitled "APPARATUSES, METHODS, AND SYSTEMS FOR USING FREQUENCY DEPENDENT CSI-RS BEAMS FOR FURTHER-ENHANCED TYPE-II CODEBOOK" and filed on Mar. 6, 2020 for Udar Mittal, which is incorporated herein by reference in its entirety.

FIELD

The subject matter disclosed herein relates generally to wireless communications and more particularly relates to channel state information report coefficients.

BACKGROUND

In certain wireless communications networks, codebooks may be used. In some configurations, codebooks may be larger than necessary and inefficient.

BRIEF SUMMARY

Methods for channel state information report coefficients are disclosed. Apparatuses and systems also perform the functions of the methods. One embodiment of a method includes receiving, at a user equipment, a set of reference signals. In some embodiments, the method includes identifying a set of ports based on the set of reference signals. In certain embodiments, the method includes selecting a subset of ports from the set of ports. In various embodiments, the method includes computing a subset of coefficients corresponding to a set of indices for each reference signal in the set of reference signals. In some embodiments, the method includes generating a channel state information report comprising the subset of coefficients corresponding to the set of indices for each port in the subset of ports.

One apparatus for channel state information report coefficients includes a user equipment. In certain embodiments, the apparatus includes a receiver that receives a set of reference signals. In various embodiments, the apparatus includes a processor that: identifies a set of ports based on the set of reference signals; selects a subset of ports from the set of ports; computes a subset of coefficients corresponding to a set of indices for each reference signal in the set of reference signals; and generates a channel state information report comprising the subset of coefficients corresponding to the set of indices for each port in the subset of ports.

Another embodiment of a method for channel state information report coefficients includes transmitting, from a base station, a set of reference signals. In some embodiments, the method includes receiving a channel state information report comprising a subset of coefficients corresponding to a set of indices for each port in a subset of ports, wherein the subset of ports are selected from a set of ports, the set of ports are based on the set of reference signals, and the subset of coefficients correspond to the set of indices for each reference signal in the set of reference signals.

Another apparatus for channel state information report coefficients includes a transmitter that transmits a set of reference signals. In various embodiments, the apparatus includes a receiver that receives a channel state information report comprising a subset of coefficients corresponding to a set of indices for each port in a subset of ports, wherein the subset of ports are selected from a set of ports, the set of ports are based on the set of reference signals, and the subset of coefficients correspond to the set of indices for each reference signal in the set of reference signals.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 5 is a table showing CSI-RS mapping for a subband for CSI-RS using Equation 3;

FIG. 6 is a table showing RE to CSI-RS mapping for a subband for CSI-RS using Equation 4;

DETAILED DESCRIPTION

Figure 1:
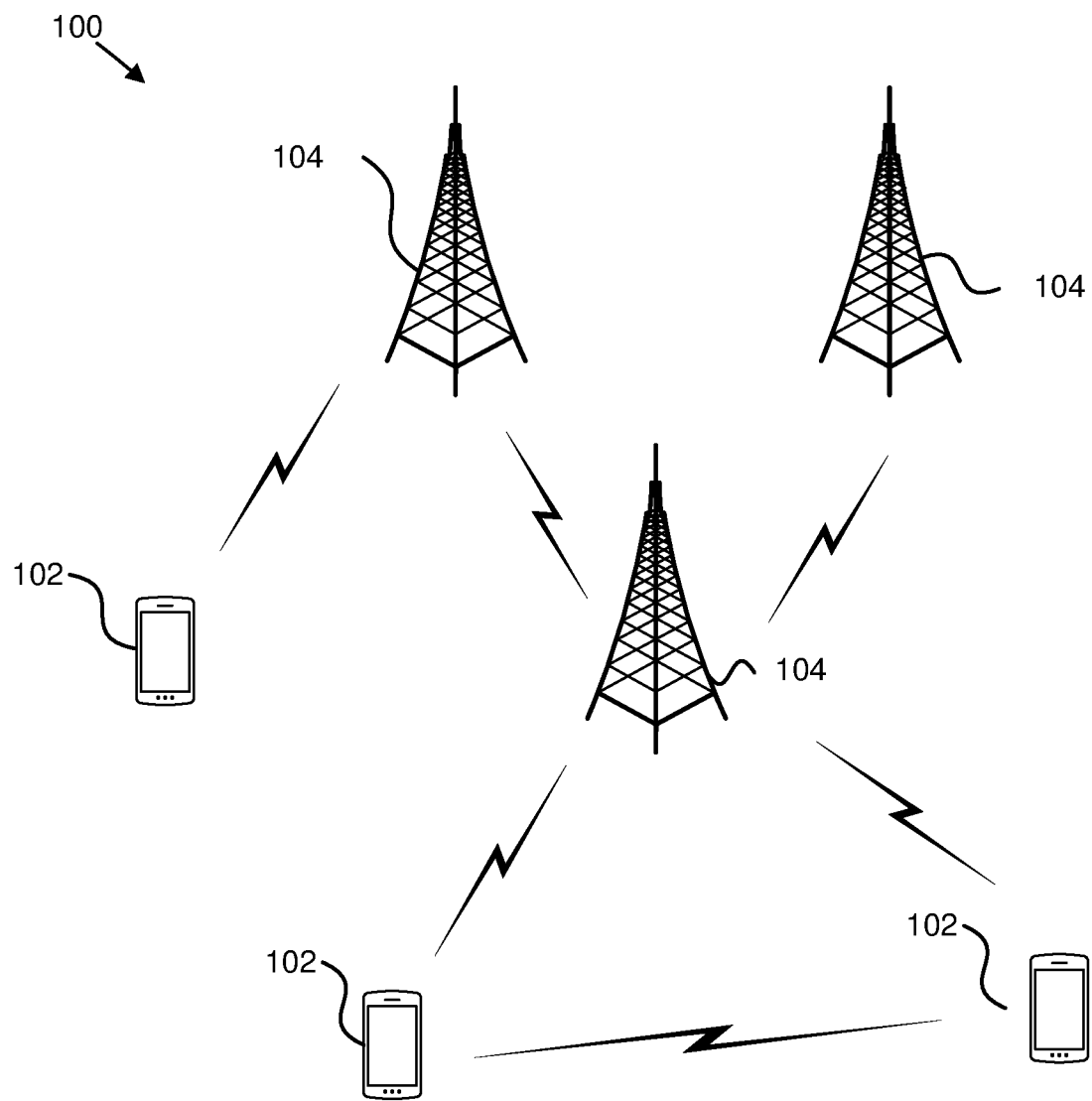
FIG. 1 is a schematic block diagram illustrating one embodiment of a wireless communication system for channel state information report coefficients.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for channel state information report coefficients. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 (e.g., user equipment) may receive a set of reference signals. In some embodiments, the remote unit 102 may identify a set of ports based on the set of reference signals. In certain embodiments, the remote unit 102 may select a subset of ports from the set of ports. In various embodiments, the remote unit 102 may compute a subset of coefficients corresponding to a set of indices for each reference signal in the set of reference signals. In some embodiments, the remote unit 102 may generate a channel state information report comprising the subset of coefficients corresponding to the set of indices for each port in the subset of ports. Accordingly, the remote unit 102 may be used for channel state information report coefficients.

In certain embodiments, a network unit 104 (e.g., base station) may transmit a set of reference signals. In some embodiments, the network unit 104 may receive a channel state information report comprising a subset of coefficients corresponding to a set of indices for each port in a subset of ports, wherein the subset of ports are selected from a set of ports, the set of ports are based on the set of reference signals, and the subset of coefficients correspond to the set of indices for each reference signal in the set of reference signals. Accordingly, the network unit 104 may be used for channel state information report coefficients.

Figure 2:
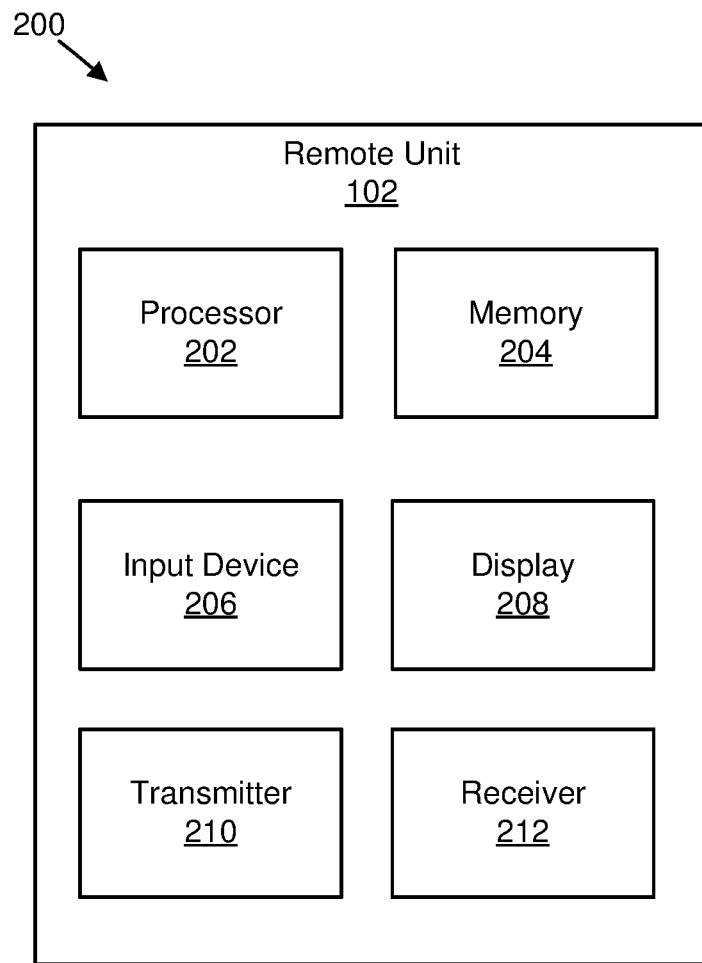
FIG. 2 is a schematic block diagram illustrating one embodiment of an apparatus that may be used for channel state information report coefficients.

FIG. 2 depicts one embodiment of an apparatus 200 that may be used for channel state information report coefficients. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the receiver 212 may receive a set of reference signals. In various embodiments, the processor 202 may: identify a set of ports based on the set of reference signals; select a subset of ports from the set of ports; compute a subset of coefficients corresponding to a set of indices for each reference signal in the set of reference signals; and generate a channel state information report comprising the subset of coefficients corresponding to the set of indices for each port in the subset of ports.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
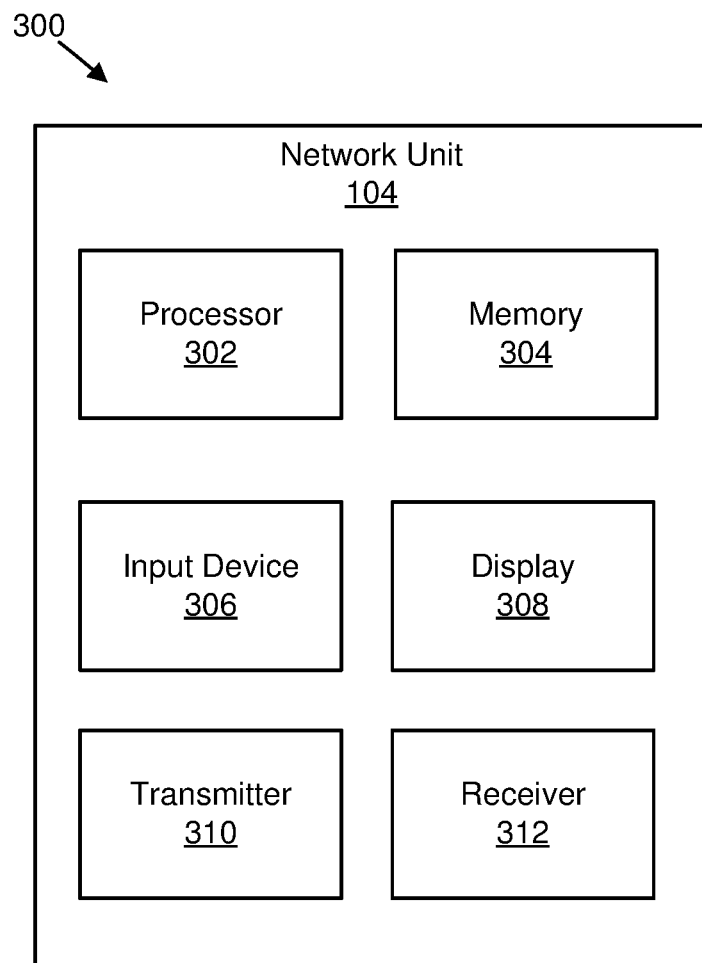
FIG. 3 is a schematic block diagram illustrating one embodiment of an apparatus that may be used for channel state information report coefficients.

FIG. 3 depicts one embodiment of an apparatus 300 that may be used for channel state information report coefficients. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the transmitter 310 may transmit a set of reference signals. In various embodiments, the receiver 312 may receive a channel state information report comprising a subset of coefficients corresponding to a set of indices for each port in a subset of ports, wherein the subset of ports are selected from a set of ports, the set of ports are based on the set of reference signals, and the subset of coefficients correspond to the set of indices for each reference signal in the set of reference signals.

In some embodiments, such as for NR Type-II codebook, a number of precoding matrix indicators ("PMI") bits fed back from a user equipment ("UE") in a gNB via uplink control information ("UCI") may be large (e.g., >1000 bits at a large bandwidth). In certain embodiments, a number of CSI-RS ports sent in a downlink channel to enable channel estimation at a user equipment may be large, thereby leading to higher system complexity and loss of resources over reference signaling. In various embodiments, a reduction of PMI feedback bits and/or a reduction in a number of CSI-RS ports used may improve efficiency. In some embodiments, a number of CSI-RS ports may be reduced via applying an underlying spatial beamforming process. In certain embodiments, a channel correlation between uplink and downlink channels may be exploited to reduce CSI feedback overhead even in a frequency-division duplexing ("FDD") mode in which an uplink-downlink ("UL-DL") carrier frequency spacing is not too large.

In various embodiments, efficient techniques for CSI-RS beamforming and uplink CSI feedback reporting may be provided to improve an efficiency of Type-II port-selection codebook.

In some embodiments, multiple-input and multiple-output ("MIMO") systems may have a throughput advantage over a single input single output system. In such embodiments, the advantage may come if a transmitter (e.g., gNB in downlink channel) has a knowledge of a downlink channel at various frequency bands. Moreover, observed channel characteristics may be used as feedback by a receiver by first observing reference signals or pilots and then transmitting feedback information about the channel to a transmitter based on the observed pilots. In such embodiments, the feedback may be referred to as channel state information ("CSI") feedback and reference signals ("RS") may be called CSI-RS. In certain embodiments, there may be a tradeoff between a number of reference signals needed for obtaining channel characteristics at a receiver, an amount of CSI feedback, and a system throughput. In various embodiments, a number of resources used for sending reference signals may be reduced and an amount of feedback information may be reduced with minimal impact on throughput. Described here are various methods for CSI feedback in which CSI-RS signals are based on an uplink channel observed by a gNB of an FDD system.

In one embodiment, let H be an Nrx×Ntx DL channel matrix observed by a UE using reference signals wherein there is a unique and identifiable reference signal for each transmitting antenna port and each RB, and let W be an Ntx×L beam space matrix, where Nrx is a number of receivers, Ntx is a number of transmitters, and L is a number of vectors in a beam space matrix. In Type-2 CSI feedback, the UE feedbacks a beam space matrix W of size (Ntx×L) and feedbacks a linear transformation coefficients $\alpha_f$ for each layer and each resource block ("RB") or a group of resource blocks (e.g., subbands) such that a precoding vector for a transmitting layer is given by: $v_f = W\alpha_f$.

The coefficients $\alpha_f$ are either direct feedback or are first transformed using discrete Fourier transform ("DFT") and then the DFT coefficients are provided as feedback. The DFT based approach may decrease a size of the CSI feedback. Since a gNB knows both W and $\alpha_f$, the gNB may generate precoding vectors to be used for the transmission.

In some embodiments, in Type-2 port-selection code, a beam space matrix W is not used as feedback by a UE. A gNB estimates W and uses it as CSI-reference signals ("CSI-RS"). The UE then provides as feedback quantized coefficients $\alpha_f$ for each RB (e.g., using a DFT based method).

In certain embodiments, in a reciprocity based approach, a gNB uses sounding reference signals ("SRS") from an uplink channel to obtain a CSI-RS for downlink and then a UE provides feedback using the CSI-RS. For this approach, let H' be an Nrx×Ntx UL channel observed by the gNB. The gNB obtains a beam space matrix based on the sounding reference signals. Let W be an Ntx×L beam space matrix. W may be obtained using Equation 1 as follows:

$$W = \underset{W_k \subseteq \Gamma}{\mathrm{argmax}} \ \mathrm{trace}\Big(\sum_f W_k^\# H_f'^\# H_f' W_k\Big),$$

where $\Gamma$ is a set of all oversampled spatial basis DFT vectors in two dimension and $W_k$ is Ntx×L such that $W_k^\# W_k = I$. The beam space matrix captures an angle of arrival for the uplink channel, which is shown to be equal to an angle of departure for the downlink channel Hence, a gNB may use W as a basis for generation of CSI-RS. The carrier frequency of uplink and downlink are not the same and typically the difference between the uplink and downlink frequency is small compared to the carrier frequency. The difference between the uplink and downlink frequency may induce a slight offset in the beams of W. Since the difference is dependent on a difference in carrier frequencies and a gNB antenna configuration, the gNB may easily modify W. In some embodiments, a mapping of W (e.g., obtained using Equation 1) and an actual W used for CSI-RS generation may be in a look up table.

In various embodiments, a delay of various paths in uplink and downlink may be nearly the same and may be estimated by a gNB using an uplink channel Hence, in such embodiments, it may be useful to design CSI-RS using delay values. To enable this, the gNB may add a transformation $U_f$, for $0 \leq f < N_{RB}$ of dimension L×M where M≥L and a rank of each $U_f$ is L, and $U_f$ may be a phase ramp matrix. The transformation $U_f$ may make a CSI-RS signal frequency and/or RB dependent and may be given by Equation 2 as follows:

$B_f = W U_f$, where $U_f$ may be of a form $\mathrm{Diag}(e^{-2j\pi f \tau_i})$, and $\tau_i$ is a peak delay value for an ith vector of HW. Such a matrix may be a phase ramp matrix which provides three different phase shifts to different columns or beams of W. The delay value $\tau_i$ may be obtained as a peak energy location of oversampled indirect data transfer ("IDFT") of $H'_f W(i)$, where W(i) is the ith vector of W. $H'_f W(i)$ is an Nrx×1 vector. Next, take an inverse fast Fourier transform ("IFFT") of each Nrx element of $H'_f W(i)$ and select $\tau_i$ as the element which results in a highest sum of energy over all Nrx elements. For port-selection codebook, K≤M ports may be selected at the UE, wherein the indices of the K selected ports are reported in a CSI report.

$U_f$ is a phase ramp matrix which provides a delay in a time domain such that after a phase shift operation, a maximum energy after an IFFT operation may shift to a dual connectivity ("DC") location. In Equation 2, it is assumed that one delay per beam is sufficient to get a good estimate of a channel. However, two or three delays per beam may be used to get a good frequency representation of a channel. As such, a $U_f$ is not a square matrix (e.g., each beam generates multiple CSI-RS signals). It may further be assumed that:

$$U_f U_f^\# = kI$$

The above assumption is true if $U_f$ is of the form (for L=3 and M=9) in Equation 3:

$$\begin{pmatrix} e^{-2j\pi f \tau_{11}} & 0 & 0 & e^{-2j\pi f \tau_{12}} & 0 & 0 & e^{-2j\pi f \tau_{13}} & 0 & 0 \\ 0 & e^{-2j\pi f \tau_{21}} & 0 & 0 & e^{-2j\pi f \tau_{22}} & 0 & 0 & e^{-2j\pi f \tau_{23}} & 0 \\ 0 & 0 & e^{-2j\pi f \tau_{31}} & 0 & 0 & e^{-2j\pi f \tau_{32}} & 0 & 0 & e^{-2j\pi f \tau_{33}} \end{pmatrix}.$$

In Equation 3, $\tau_{ij}$ may indicate a delay value of the $j^{th}$ tap corresponding to the $i^{th}$ column of HW. The matrix of Equation 3 is a phase ramp matrix which provides three different phase shifts to different columns or beams of W. $U_f$ may also be of the form in Equation 4 as follows:

$$\begin{pmatrix} e^{-2j\pi f\tau_{11}} & 0 & 0 \\ 0 & e^{-2j\pi f\tau_{21}} & 0 \\ 0 & 0 & e^{-2j\pi f\tau_{31}} \end{pmatrix} \otimes \begin{pmatrix} 1 & e^{-2j\pi f\tau_1} & e^{-2j\pi f\tau_2} \end{pmatrix},$$

where $\otimes$ is a kronecker product operator. As may be appreciated, in some embodiments, there may be advantages to using Equation 4 over Equation 3.

In certain embodiments, for each RB, a UE observes, using CSI-RS, a matrix $HWU_f$. In such embodiments, CSI feedback from UE may provide an estimate of a downlink channel for each frequency to a gNB. The UE for each receiver antenna provides a DC value of an IFFT of each received CSI-RS signal. For each receiver antenna port there may be M DC values. The M-DC values $\mu_{ik}$ may be reported by a UE where $0 < i \leq M$ and $0 < k \leq N_{Rx}$. It should be noted that $\mu_{(Lm+t)\,k}$ are the coefficients reported for the t-th beam in W. The gNB may estimate frequency domain coefficients for each beam and each received antenna as: $s_{tk}(f)=\Sigma_m \mu_{(Lm+t)k}e^{-2\pi if\tau_{km}}$, and a channel matrix for each receiver antenna k may be estimated as: $\hat{H}_f(k)=\Sigma_t s_{tk}(f)W(t)$.

In some embodiments, after a gNB is able to estimate a downlink channel matrix (e.g., for all frequencies), the gNB may generate precoding vectors used for transmission. For CSI feedback, the gNB may need an observed channel quality indicator ("CQI") level at a UE. The UE may report a measured signal to noise ratio ("SINR") for every subband and each CSI-RS signal for every received antenna. The gNB may then estimate modulation and coding scheme ("MCS") levels from the reported SINR values.

In various embodiments, a gNB estimates a full channel matrix for all RBs and then based on the estimate of the channel matrix and estimated CQI levels, the gNB computes a rank and precoding vectors used for transmission.

In certain embodiments, a UE may provide per layer feedback. In a layer based approach, for each f (or subband), the UE may find a singular vector corresponding to a maximum singular value. Let $w_f$ be a right singular vector corresponding to the maximum singular value. The UE quantizes $w_f$ to $\hat{w}_f$ and reports this quantized singular vector as a precoding vector of a first layer to a gNB. The UE may use a DFT based transformation to generate precoding vectors for each RB and/or subband.

In some embodiments, a UE computes a singular vector corresponding to $H_f W U_f$; however, a gNB may be interested in singular vectors of $H_f W$. Since $w_f$ is a singular vector of $H_f W U_f$, $U_f^\# W^\# H_f^\# W U_f w_f = \sigma_{max}^2 w_f$ Multiplying both sides with $U_f$ results in: $U_f U_f^\# W^\# H_f^\# H_f W U_f w_f = \sigma_{max}^2 U_f w_f$ Since $U_f U_f^\# = kI$, then $kW^\# H_f^\# H_f W U_f w_f = \sigma_{max}^2 U_f w_f$.

$U_f w_f$ is the right singular vector of $W^\# H_f^\# H_f W$ with a maximum singular value equal to $$\frac{\sigma_{max}^2}{k}.$$

For a quantized precoding vector $\hat{w}_f$ feedback by a UE, a gNB may obtain a quantized precoding vector for a first layer using an Equation 5 as follows:

$$\hat{v}_f = U_f \hat{w}_f.$$

In certain embodiments, to compute a precoding vector of a second layer, a UE removes a component in a direction of a first layer from an observed channel matrix. This is considered projecting out a channel matrix. The UE finds a maximum singular vector of the projected out channel matrix. At a gNB side, the gNB projects out a precoding vector of the first layer.

The projected out channel matrix for the UE is: $H_f W U_f (I - \hat{w}_f \hat{w}_f^\#)$.

It is assumed that $\hat{w}_f$ is a unit norm vector—called matrix $Q_{ue}$.

$$Q_{ue} U_f^\# = H_f W (kI - \hat{v}_f \hat{v}_f^\#).$$

The $\hat{v}_f$ obtained in Equation 5 may not have a unit norm. The norm of $\hat{v}_f$ is: $\hat{v}_f^\# \hat{v}_f = \hat{w}_f^\# U_f^\# U_f \hat{w}_f$.

If $U_f$ is as given in Equation 1 or Equation 2 and phase angles of $\hat{w}_{f(Li+j)}$, $0 \leq i \leq k-1$, $0 \leq j \leq L-1$ are independent for different values of j. Then $\hat{v}_f^\# \hat{v}_f$ may be approximated as k $\hat{w}_f^\# \hat{w}_f = k$. Therefore, $Q_{ue} U_f^\# = H_f W(kI - k\hat{v'}_f \hat{v'}_f^\#)$, where $\hat{v'}_f$ is a unit vector in a direction of $\hat{v}_f$. So $Q_{ue} U_f^\#$ may be said to be a projected out channel matrix for a gNB.

If x is a singular vector of a projected out channel matrix $Q_{ue}$, then $Q_{ue}^\# Q_{ue} x = sx$, where s is a scalar.

Multiplying both sides by $U_f$ results in: $U_f Q_{ue}^\# Q_{ue} x = sU_f x$. y may be obtained such that $U_f^\# y = x$, then $U_f Q_{ue}^\# Q_{ue} U_f^\# y = sy$.

Thus y is a singular vector of a projected out channel matrix at the gNB side.

In certain embodiments, with a layer based approach a UE for CQI purposes may report measured SINR for every subband and each CSI-RS signal and every received antenna. A gNB may then estimate a CQI level for any possible transmission rank. One advantage of a layer based approach may be that a UE may estimate a rank and may find that the rank is smaller than a full rank. Thus, the UE may report $K \leq M$ coefficients (e.g., because many of them may be zero). In such embodiments, a codebook UE may use a bitmap to indicate these M coefficients to selectively quantize only the non-zero coefficients.

In relation to Equations 2, 3, and 4, resources used for CSI-RS signals may be examined. In various embodiments, CSI-RS signals may be placed in a first OFDM symbol of each RB.

Figure 4:
FIG. 4 is a table showing CSI-RS to RE mapping for a subband for CSI-RS using Equation 2.

FIG. 4 is a table 400 showing CSI-RS to RE mapping for a subband for CSI-RS using Equation 2. In FIG. 4, a CSI-RS configuration is shown for a subband having 4 RBs. The resource used for various CSI-RS are shown in the table 400. They are marked as a beam (W(k)) and delay (f$\tau_k$) pair. For Equation 1, there may be only one delay value per beam. In one example, L=5.

Using Equation 3 and with L=3 and M=9 a better result may occur than if L=5 and there is one delay per beam. Using CSI-RS signals of Equation 3 directly as in table 400 (e.g., a RE is allocated in each RB for CSI-RS corresponding to every (W(k)) and delay (f$\tau_{ik}$) pair), may result in too many REs being used for CSI-RS. In some embodiments, a resource element may be mapped to (W(k)) and delay (f$\tau_{ik}$) as shown in FIG. 5. FIG. 5 is a table 500 showing CSI-RS mapping for a subband for CSI-RS using Equation 3.

The pair W(k) and f$\tau_{kj}$ for j>1 may only be allocated to one RB per subband instead of all RBs in the subband. In various embodiments, CSI-RS may be used only for estimating a delay $\tau_{kj}$ and not a channel response that has been measured by the W(k) and f$\tau_{k1}$ pair. In some embodiments, resources in each subband for estimating delays may not be allocated; however, allocating resources in each subband may prevent wrong estimation during frequency fading. As illustrated, a number of REs used for CSI-RS in table 500 are less than the number of REs used for CSI-RS in table 400.

In certain embodiments, after selecting a best delay for each beam, remaining delays for each beam may be limited such that their differences from the best delay may be the same (e.g., Equation 4). This limitation may result in a very insignificant loss in channel estimation compared to if all delays of all beams are chosen independently. RE mapping for CSI-RS formed using Equation 4 is shown in FIG. 6 which results in a further saving of REs used for CSI-RS. Specifically, FIG. 6 is a table 600 showing RE to CSI-RS mapping for a subband for CSI-RS using Equation 4.

Figure 7:
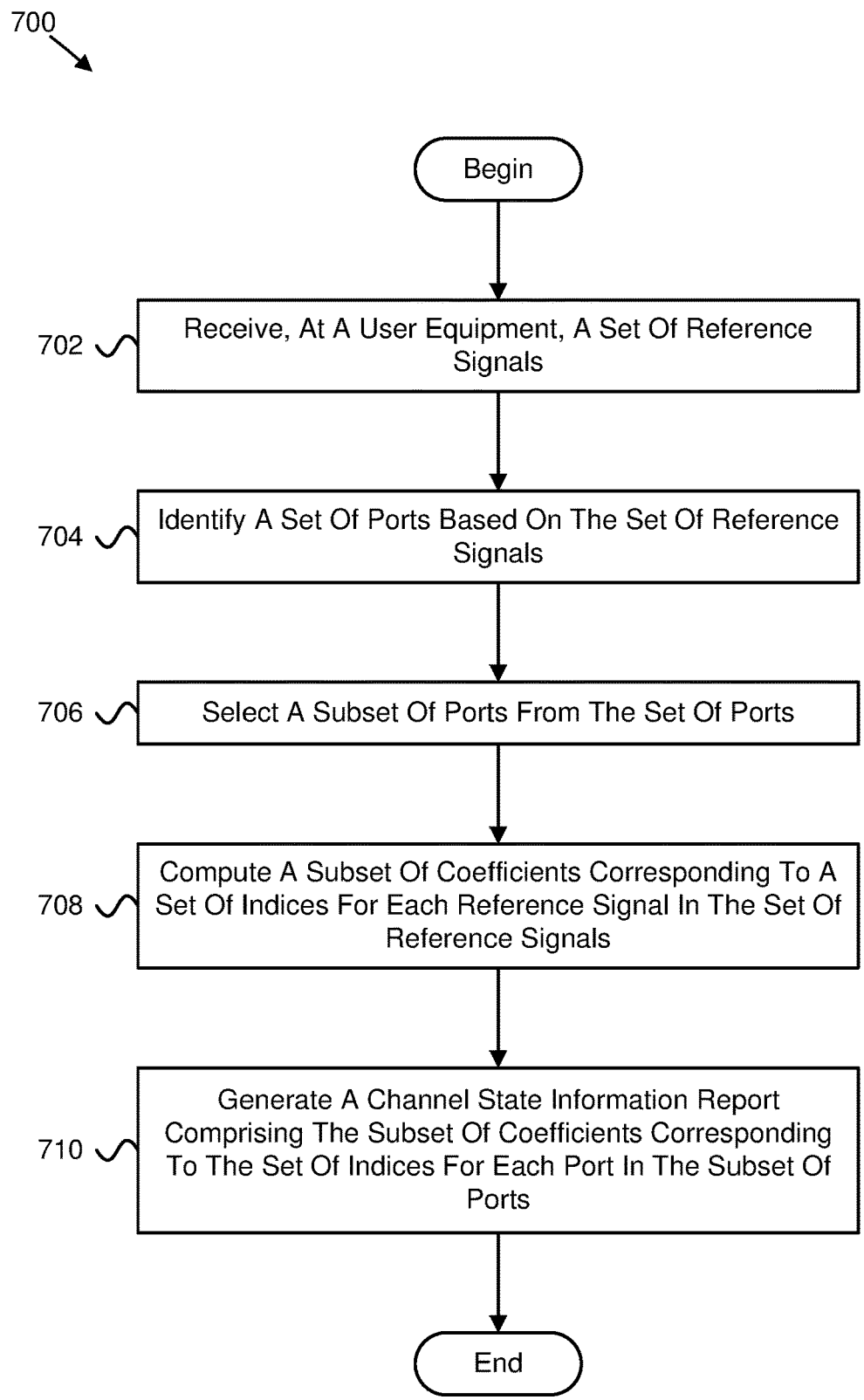
FIG. 7 is a flow chart diagram illustrating one embodiment of a method for channel state information report coefficients.

FIG. 7 is a flow chart diagram illustrating one embodiment of a method 700 for channel state information report coefficients. In some embodiments, the method 700 is performed by an apparatus, such as the remote unit 102. In certain embodiments, the method 700 may be performed by a processor executing program code, for example, a microcontroller, a microprocessor, a CPU, a GPU, an auxiliary processing unit, a FPGA, or the like.

In various embodiments, the method 700 includes receiving 702, at a user equipment, a set of reference signals. In some embodiments, the method 700 includes identifying 704 a set of ports based on the set of reference signals. In certain embodiments, the method 700 includes selecting 706 a subset of ports from the set of ports. In various embodiments, the method 700 includes computing 708 a subset of coefficients corresponding to a set of indices for each reference signal in the set of reference signals. In some embodiments, the method 700 includes generating 710 a channel state information report comprising the subset of coefficients corresponding to the set of indices for each port in the subset of ports.

In certain embodiments, the subset of coefficients corresponding to the set of indices for each port in the subset of ports comprises a first coefficient of the subset of coefficients for each port in the subset of ports. In some embodiments, the received set of reference signals are channel state information reference signals. In various embodiments, the channel state information reference signals are mapped to resource elements based on a set of sounding reference signals transmitted from the user equipment.

In one embodiment, the subset of coefficients corresponding to the set of indices for each port in the subset of ports corresponds to one or more layers. In certain embodiments, each coefficient in the subset of coefficients corresponds to one layer. In some embodiments, the set of reference signals are beamformed using a beamforming function, and the beamforming function is based on at least one channel characteristic comprising angles of arrival and relative delay values for a plurality of different channel paths.

In various embodiments, the beamforming function is a product of two matrices, and a first matrix of the two matrices is a matrix with orthonormal columns drawn from a Fourier-based transform. In one embodiment, a second matrix of the two matrices comprises a product of a Kronecker-based product of a diagonal matrix with a vector. In certain embodiments, a second matrix of the two matrices are based on angles of arrival of a subset of a set of channel paths, relative delay values of the subset of the set of channel paths, or a combination thereof.

Figure 8:
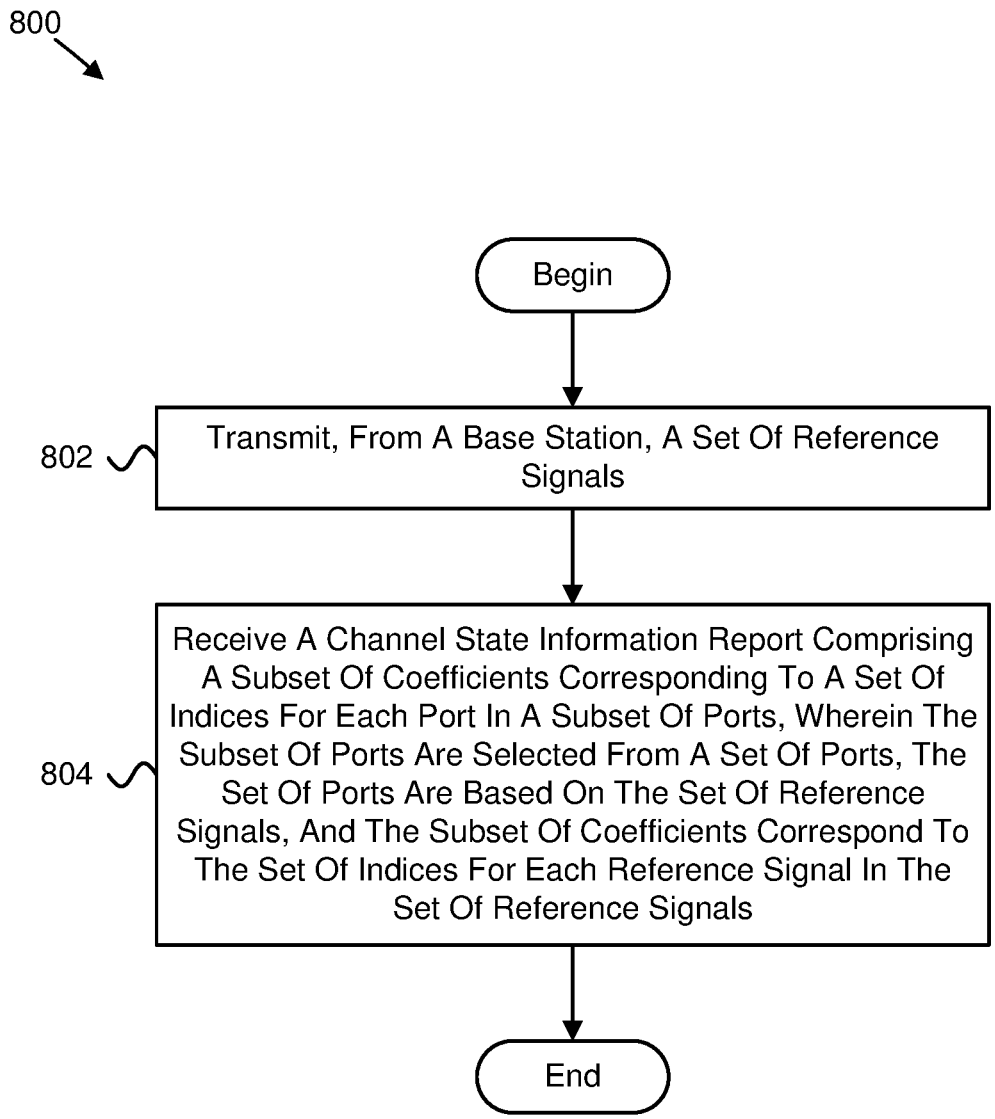
FIG. 8 is a flow chart diagram illustrating another embodiment of a method for channel state information report coefficients.

FIG. 8 is a flow chart diagram illustrating another embodiment of a method 800 for channel state information report coefficients. In some embodiments, the method 800 is performed by an apparatus, such as the network unit 104. In certain embodiments, the method 800 may be performed by a processor executing program code, for example, a microcontroller, a microprocessor, a CPU, a GPU, an auxiliary processing unit, a FPGA, or the like.

In various embodiments, the method 800 includes transmitting 802, from a base station, a set of reference signals. In some embodiments, the method 800 includes receiving 804 a channel state information report comprising a subset of coefficients corresponding to a set of indices for each port in a subset of ports, wherein the subset of ports are selected from a set of ports, the set of ports are based on the set of reference signals, and the subset of coefficients correspond to the set of indices for each reference signal in the set of reference signals.

In certain embodiments, the subset of coefficients corresponding to the set of indices for each port in the subset of ports comprises a first coefficient of the subset of coefficients for each port in the subset of ports. In some embodiments, the transmitted set of reference signals are channel state information reference signals. In various embodiments, the channel state information reference signals are mapped to resource elements based on a set of sounding reference signals transmitted from the user equipment.

In one embodiment, the subset of coefficients corresponding to the set of indices for each port in the subset of ports corresponds to one or more layers. In certain embodiments, each coefficient in the subset of coefficients corresponds to one layer. In some embodiments, the set of reference signals are beamformed using a beamforming function, and the beamforming function is based on at least one channel characteristic comprising angles of arrival and relative delay values for a plurality of different channel paths.

In various embodiments, the beamforming function is a product of two matrices, and a first matrix of the two matrices is a matrix with orthonormal columns drawn from a Fourier-based transform. In one embodiment, a second matrix of the two matrices comprises a product of a Kronecker-based product of a diagonal matrix with a vector. In certain embodiments, a second matrix of the two matrices are based on angles of arrival of a subset of a set of channel paths, relative delay values of the subset of the set of channel paths, or a combination thereof.

In one embodiment, a method comprises: receiving, at a user equipment, a set of reference signals; identifying a set of ports based on the set of reference signals; selecting a subset of ports from the set of ports; computing a subset of coefficients corresponding to a set of indices for each reference signal in the set of reference signals; and generating a channel state information report comprising the subset of coefficients corresponding to the set of indices for each port in the subset of ports.

In certain embodiments, the subset of coefficients corresponding to the set of indices for each port in the subset of ports comprises a first coefficient of the subset of coefficients for each port in the subset of ports.

In some embodiments, the received set of reference signals are channel state information reference signals.

In various embodiments, the channel state information reference signals are mapped to resource elements based on a set of sounding reference signals transmitted from the user equipment.

In one embodiment, the subset of coefficients corresponding to the set of indices for each port in the subset of ports corresponds to one or more layers.

In certain embodiments, each coefficient in the subset of coefficients corresponds to one layer.

In some embodiments, the set of reference signals are beamformed using a beamforming function, and the beamforming function is based on at least one channel characteristic comprising angles of arrival and relative delay values for a plurality of different channel paths.

In various embodiments, the beamforming function is a product of two matrices, and a first matrix of the two matrices is a matrix with orthonormal columns drawn from a Fourier-based transform.

In one embodiment, a second matrix of the two matrices comprises a product of a Kronecker-based product of a diagonal matrix with a vector.

In certain embodiments, a second matrix of the two matrices are based on angles of arrival of a subset of a set of channel paths, relative delay values of the subset of the set of channel paths, or a combination thereof.

In one embodiment, an apparatus comprises a user equipment. The apparatus further comprises: a receiver that receives a set of reference signals; and a processor that: identifies a set of ports based on the set of reference signals; selects a subset of ports from the set of ports; computes a subset of coefficients corresponding to a set of indices for each reference signal in the set of reference signals; and generates a channel state information report comprising the subset of coefficients corresponding to the set of indices for each port in the subset of ports.

In certain embodiments, the subset of coefficients corresponding to the set of indices for each port in the subset of ports comprises a first coefficient of the subset of coefficients for each port in the subset of ports.

In some embodiments, the received set of reference signals are channel state information reference signals.

In various embodiments, the channel state information reference signals are mapped to resource elements based on a set of sounding reference signals transmitted from the user equipment.

In one embodiment, the subset of coefficients corresponding to the set of indices for each port in the subset of ports corresponds to one or more layers.

In certain embodiments, each coefficient in the subset of coefficients corresponds to one layer.

In some embodiments, the set of reference signals are beamformed using a beamforming function, and the beamforming function is based on at least one channel characteristic comprising angles of arrival and relative delay values for a plurality of different channel paths.

In various embodiments, the beamforming function is a product of two matrices, and a first matrix of the two matrices is a matrix with orthonormal columns drawn from a Fourier-based transform.

In one embodiment, a second matrix of the two matrices comprises a product of a Kronecker-based product of a diagonal matrix with a vector.

In certain embodiments, a second matrix of the two matrices are based on angles of arrival of a subset of a set of channel paths, relative delay values of the subset of the set of channel paths, or a combination thereof.

In one embodiment, a method comprises: transmitting, from a base station, a set of reference signals; and receiving a channel state information report comprising a subset of coefficients corresponding to a set of indices for each port in a subset of ports, wherein the subset of ports are selected from a set of ports, the set of ports are based on the set of reference signals, and the subset of coefficients correspond to the set of indices for each reference signal in the set of reference signals.

In certain embodiments, the subset of coefficients corresponding to the set of indices for each port in the subset of ports comprises a first coefficient of the subset of coefficients for each port in the subset of ports.

In some embodiments, the transmitted set of reference signals are channel state information reference signals.

In various embodiments, the channel state information reference signals are mapped to resource elements based on a set of sounding reference signals transmitted from the user equipment.

In one embodiment, the subset of coefficients corresponding to the set of indices for each port in the subset of ports corresponds to one or more layers.

In certain embodiments, each coefficient in the subset of coefficients corresponds to one layer.

In some embodiments, the set of reference signals are beamformed using a beamforming function, and the beamforming function is based on at least one channel characteristic comprising angles of arrival and relative delay values for a plurality of different channel paths.

In various embodiments, the beamforming function is a product of two matrices, and a first matrix of the two matrices is a matrix with orthonormal columns drawn from a Fourier-based transform.

In one embodiment, a second matrix of the two matrices comprises a product of a Kronecker-based product of a diagonal matrix with a vector.

In certain embodiments, a second matrix of the two matrices are based on angles of arrival of a subset of a set of channel paths, relative delay values of the subset of the set of channel paths, or a combination thereof.

In one embodiment, an apparatus comprises a base station. The apparatus further comprises: a transmitter that transmits a set of reference signals; and a receiver that receives a channel state information report comprising a subset of coefficients corresponding to a set of indices for each port in a subset of ports, wherein the subset of ports are selected from a set of ports, the set of ports are based on the set of reference signals, and the subset of coefficients correspond to the set of indices for each reference signal in the set of reference signals.

In certain embodiments, the subset of coefficients corresponding to the set of indices for each port in the subset of ports comprises a first coefficient of the subset of coefficients for each port in the subset of ports.

In some embodiments, the transmitted set of reference signals are channel state information reference signals.

In various embodiments, the channel state information reference signals are mapped to resource elements based on a set of sounding reference signals transmitted from the user equipment.

In one embodiment, the subset of coefficients corresponding to the set of indices for each port in the subset of ports corresponds to one or more layers.

In certain embodiments, each coefficient in the subset of coefficients corresponds to one layer.

In some embodiments, the set of reference signals are beamformed using a beamforming function, and the beamforming function is based on at least one channel characteristic comprising angles of arrival and relative delay values for a plurality of different channel paths.

In various embodiments, the beamforming function is a product of two matrices, and a first matrix of the two matrices is a matrix with orthonormal columns drawn from a Fourier-based transform.

In one embodiment, a second matrix of the two matrices comprises a product of a Kronecker-based product of a diagonal matrix with a vector.

In certain embodiments, a second matrix of the two matrices are based on angles of arrival of a subset of a set of channel paths, relative delay values of the subset of the set of channel paths, or a combination thereof.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:
receiving a set of reference signals;
identifying a set of ports based on the set of reference signals;
selecting a subset of ports from the set of ports;
computing a subset of coefficients corresponding to a set of indices for each reference signal in the set of reference signals; and
generating a channel state information report comprising the subset of coefficients corresponding to the set of indices for each port in the subset of ports;
wherein the set of reference signals are beamformed using a beamforming function that is a product of two matrices, a first matrix of the two matrices is a matrix with orthonormal columns drawn from a Fourier-based transform, and a second matrix of the two matrices comprises a product of a Kronecker-based product of a diagonal matrix with a vector.

2. The method of claim 1, wherein the subset of coefficients corresponding to the set of indices for each port in the subset of ports comprises a first coefficient of the subset of coefficients for each port in the subset of ports.

3. The method of claim 1, wherein the received set of reference signals are channel state information reference signals.

4. The method of claim 3, wherein the channel state information reference signals are mapped to resource elements based on a set of sounding reference signals transmitted from the UE.

5. The method of claim 1, wherein the subset of coefficients corresponding to the set of indices for each port in the subset of ports corresponds to one or more layers.

6. The method of claim 5, wherein each coefficient in the subset of coefficients corresponds to one layer.

7. The method of claim 1, wherein the beamforming function is based on at least one channel characteristic comprising angles of arrival and relative delay values for a plurality of different channel paths.

8. The method of claim 1, wherein the second matrix of the two matrices is based on angles of arrival of a subset of a set of channel paths, relative delay values of the subset of the set of channel paths, or a combination thereof.

9. A user equipment (UE), comprising:
at least one memory; and
at least one processor coupled with the at least one memory and configured to cause the UE to:
receive a set of reference signals;
identify a set of ports based on the set of reference signals;
select a subset of ports from the set of ports;
compute a subset of coefficients corresponding to a set of indices for each reference signal in the set of reference signals; and
generate a channel state information report comprising the subset of coefficients corresponding to the set of indices for each port in the subset of ports;
wherein the set of reference signals are beamformed using a beamforming function that is a product of two matrices, a first matrix of the two matrices is a matrix with orthonormal columns drawn from a Fourier-based transform, and a second matrix of the two matrices comprises a product of a Kronecker-based product of a diagonal matrix with a vector.

10. The UE of claim 9, wherein the subset of coefficients corresponding to the set of indices for each port in the subset of ports comprises a first coefficient of the subset of coefficients for each port in the subset of ports.

11. The UE of claim 9, wherein the subset of coefficients corresponding to the set of indices for each port in the subset of ports corresponds to one or more layers.

12. The UE of claim 9, wherein the received set of reference signals are channel state information reference signals.

13. The UE of claim 12, wherein the channel state information reference signals are mapped to resource elements based on a set of sounding reference signals transmitted from the UE.

14. The UE of claim 9, wherein the subset of coefficients corresponding to the set of indices for each port in the subset of ports corresponds to one or more layers.

15. The UE of claim 14, wherein each coefficient in the subset of coefficients corresponds to one layer.

16. A base station, comprising:
at least one memory; and
at least one processor coupled with the at least one memory and configured to cause the base station to:
transmit a set of reference signals; and
receive a channel state information report comprising a subset of coefficients corresponding to a set of indices for each port in a subset of ports, wherein the subset of ports are selected from a set of ports, the set of ports are based on the set of reference signals, and the subset of coefficients correspond to the set of indices for each reference signal in the set of reference signals;
wherein the transmitted set of reference signals are channel state information reference signals;
wherein the set of reference signals are beamformed using a beamforming function, the beamforming function is based on at least one channel characteristic comprising angles of arrival and relative delay values for a plurality of different channel paths, the beamforming function is a product of two matrices, and a first matrix of the two matrices is a matrix with orthonormal columns drawn from a Fourier-based transform; and
wherein a second matrix of the two matrices comprises a product of a Kronecker-based product of a diagonal matrix with a vector and is based on angles of arrival of a subset of a set of channel paths, relative delay values of the subset of the set of channel paths, or a combination thereof.

17. The base station of claim 16, wherein the channel state information reference signals are mapped to resource elements based on a set of sounding reference signals transmitted from a user equipment (UE).

18. The base station of claim 16, wherein the subset of coefficients corresponding to the set of indices for each port in the subset of ports comprises a first coefficient of the subset of coefficients for each port in the subset of ports.

19. The base station of claim 16, wherein the subset of coefficients corresponding to the set of indices for each port in the subset of ports corresponds to one or more layers.

20. The base station of claim 19, wherein each coefficient in the subset of coefficients corresponds to one layer.

* * * * *